Aug. 29, 1939. E. F. NORELIUS 2,171,508

TRACTOR

Filed Sept. 30, 1936 2 Sheets-Sheet 1

Inventor
E. F. Norelius
by
Attorney

Aug. 29, 1939.  E. F. NORELIUS  2,171,508
TRACTOR
Filed Sept. 30, 1936   2 Sheets-Sheet 2
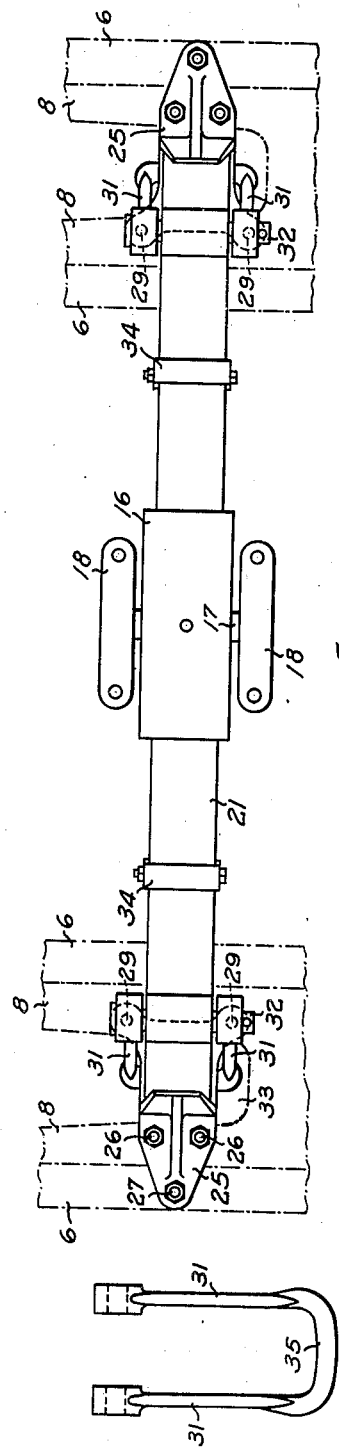
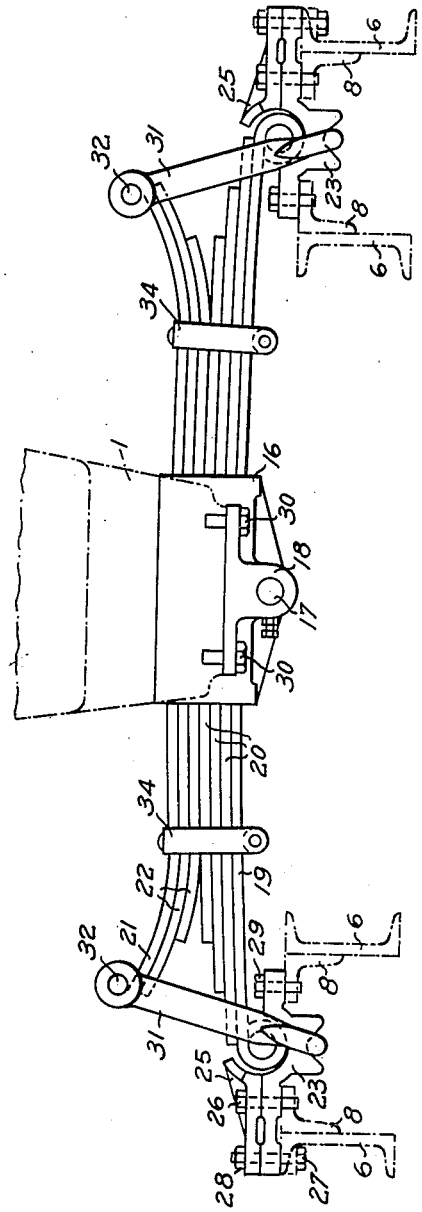
Inventor
E. F. Norelius
by
Attorney Patented Aug. 29, 1939

2,171,508

UNITED STATES PATENT OFFICE 2,171,508

TRACTOR

Emil F. Norelius, Springfield, Ill., assignor to Allis-Chalmers Manufacturing Company, Milwaukee, Wis., a corporation of Delaware Application September 30, 1936, Serial No. 103,234

3 Claims. (Cl. 305—8)

This invention relates to land vehicles and it is concerned with improvements in the mounting of the vehicle body on the running gear.

More specifically, the invention relates to endless track vehicles and to improvements in mounting the body or main frame of a track laying tractor on the track frames.

It is an object of the invention to check or lessen the pitching of the main frame relative to the track frames, which occurs, or is likely to occur, in track type tractors in which the main and track frames are connected for resilient up and down movements relative to each other.

Another object of the invention is to avoid spring breakage due to excessive pitching of the main frame.

A further object of the invention is to prevent excessive pitching of the body or main frame of a track type tractor during abrupt starting and stopping of the tractor.

A further object of the invention is to provide a three point suspension for the main frame on the track frames, in which the main frame is resiliently sustained on the track frames by a forward transverse leaf spring, and in which the main frame is restrained from excessive pitching due to rebound of the leaf spring. In this connection it is a further object of the invention to reduce the enhanced tendency of the main frame to pitch due to an overhanging weight at the rear of the vehicle.

A further object of the invention is to provide a double acting spring assembly which, at the one hand, resiliently supports the main frame on the track frames and, at the other hand, restrains the main frame from excessive pitching relative to the track frames.

A further object of the invention is to provide a double acting spring assembly for a three point suspension, which is simple and compact, readily installed, efficient in operation, and which may be manufactured at low costs.

These and other objects and advantages of the invention will be apparent from the following description. A clear conception of an embodiment of the invention and of the operation of a device constructed in accordance therewith, may be had by referring to the drawings accompanying and forming a part of this specification in which like reference characters designate the same or similar parts in the various views.

Fig. 3 is a front view of the forward spring assembly of the tractor shown in Figs. 1 and 2, parts of the main and track frames being indicated in dash dotted lines;

Fig. 4 is a top view of the spring assembly shown in Fig. 3; and

Fig. 5 is a detail view of one of the shackle elements of the spring assembly.

Figure 1:
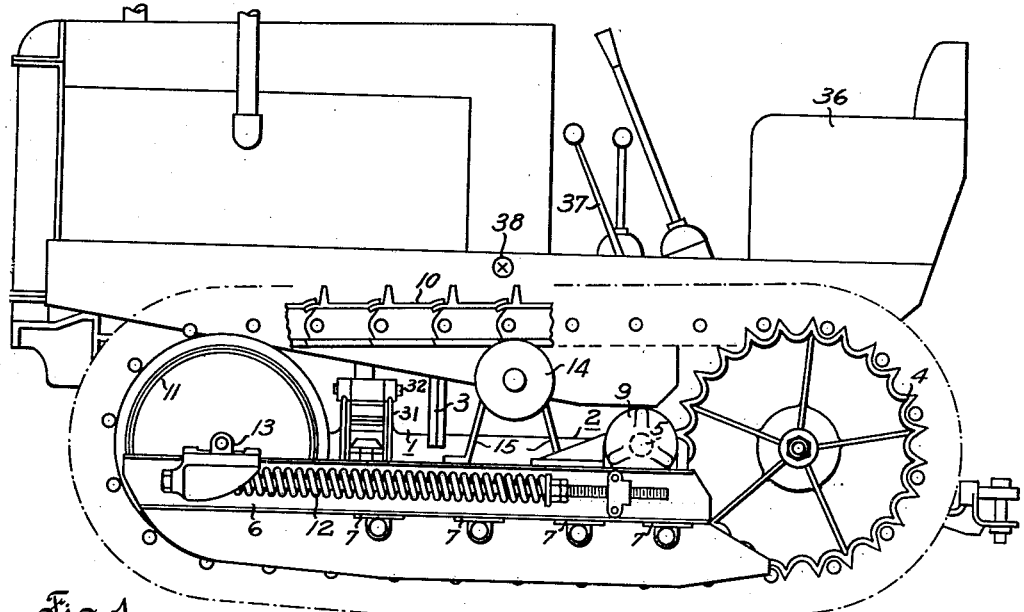
Fig. 1 is a side view of a track type tractor.
Figure 2:
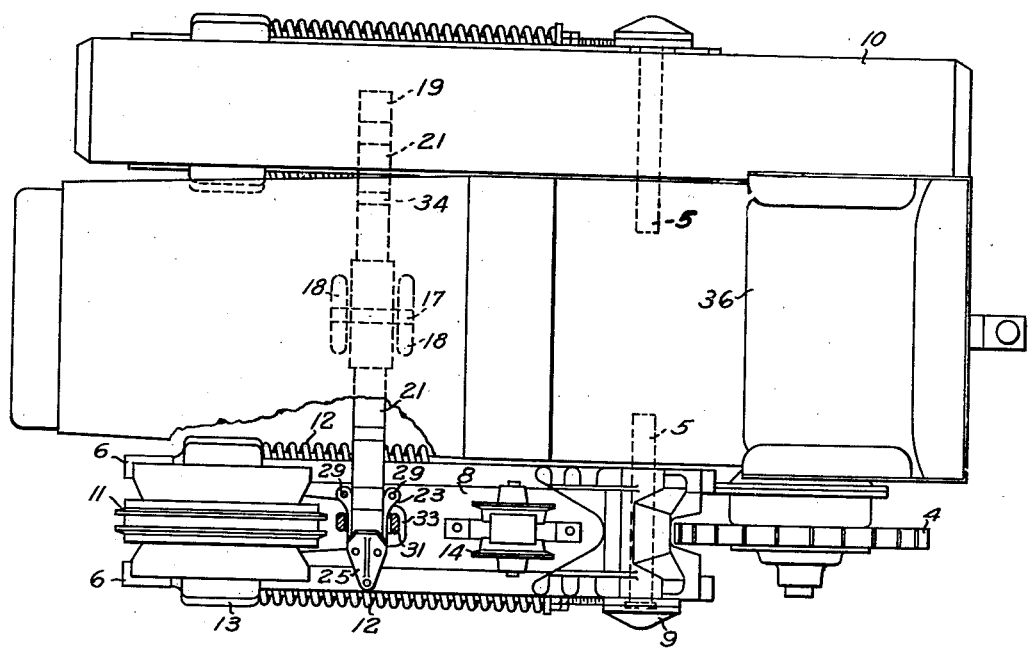
Fig. 2 is a top view of the tractor shown in Fig. 1, one track belt being omitted for purposes of disclosure.

The tractor shown in Figs. 1 and 2 is of the type in which the main frame consists of two major units, namely, a forward engine unit and a rearward transmission unit, which are rigidly bolted together. The engine unit includes a motor crank case 1, and the transmission unit includes a transmission housing 2, the crank case 1 having a rearward flange which is bolted to a forward flange of the transmission housing 2, as indicated at 3 in Fig. 1. At the rear of the transmission unit are the usual track belt drive sprockets which are rotatably mounted on the transmission housing 2 in a conventional manner, the left track belt drive sprocket being indicated by the reference character 4. Securely mounted on the transmission housing 2 and projecting laterally therefrom at opposite sides are axially alined stub shafts 5 for connecting the track frames to the main frame. The stub shafts are located forwardly of the track belt drive sprockets, which makes it somewhat easier to connect the track frames to the main frame than if the track frames were pivoted to the main frame on the same axis as the track belt drive sprockets. Each of the track frames is made up of a pair of side channels 6 and an inverted top channel 8 secured to the side channels (Fig. 3). Mounted between the side channels by means of bearings 7 are the usual load supporting rollers which are not shown in the drawings. At the rear of each track frame is a strong journal bearing 9 which embraces the stub shaft 5 at the respective side of the tractor and which pivotally connects the track frame with the main frame. The journal bearing 9 is bolted to the upper flanges of the channels 6 and is properly spaced from the adjacent track belt drive sprocket 4 so as to permit free rotation of the latter about its axis, irrespective of swinging movements of the track frame about the axis of stub shaft 5. Front idlers for the endless track belt 10 at each side of the tractor, are mounted between the forward ends of the channels 6 of each track frame, the front idler of the left track frame being indicated by the reference character 11. Coil springs 12 are mounted along the sides of the track frames for cooperation with the bearings 13 of the front idlers in the well known manner. A roller 14 mounted on an arched bracket 15 on each track frame supports the upper run of the track belt 10.

Referring now to the forward support of the main frame on the track frames, this is afforded by the spring assembly shown in detail in Figs. 3 and 4. The crank case 1 has a transverse recess near its rear end, in which a spring supporting bracket 16 is arranged for transverse swinging movements about an axis extending longitudinally of the main frame. The spring bracket is a substantially square tubular body formed with a downward bearing projection at its lower side, a pivot pin 17 being journaled in the bearing projection and extending therefrom at opposite sides of the tubular body of the bracket. The ends of the pivot pin 17 are non-rotatably secured in bearings 18 which are secured to the under side of the crank case 1 at opposite sides of the transverse recess thereof by means of bolts 30. Mounted within the spring bracket 16 are two leaf springs, a lower or main leaf spring consisting of a main leaf 19 and additional leaves 20 on top of the main leaf, and an upper or auxiliary leaf spring consisting of a main leaf 21 and additional leaves 22 under the main leaf 21. The ends of the main leaf 19 are bent into cylindrical eyes which are received by spring sockets 23 mounted on the track frames, the spring sockets forming supports for the ends of the lower or main leaf spring. Each spring socket has a semi-circular recess of somewhat larger diameter than the cylindrical eye of the main leaf 19 which is seated in the semi-circular recess of the spring socket. A cap 25 is placed on the outer mounting lug of each spring socket and is retained thereon by cap screws 26 and by a bolt 27 and a nut 28; the cap screws 26 extend through the outer mounting lug of the spring socket and are threaded into the web of the inverted top channel 8, and the bolt 27 extends through the upper flange of the outer channel 6 and through the outer mounting lug of the spring socket. An inner mounting lug of the spring socket is retained on the inverted top channel 8 by two cap screws 29. The cap 25 has an upwardly curved inner end which projects over the outer part of the eye at the end of the main leaf 19; the curved surface of the cap facing the eye follows the circle of the semi-circular recess in the spring socket, and the eye, therefore, has limited play relative to the curved end of the cap 25. This limited play affords the necessary freedom of movement of the eyes 19 within the spring sockets 23 incident to oscillations of the track frames about the stub shafts 5, and during such oscillations the eyes may strike the curved ends of the caps 25.

The outer ends of the main leaf 21 of the upper or auxiliary leaf spring are bent over to form cylindrical eyes, and U-shaped shackle members 31 are pivotally connected to the eyes by means of pins 32. The transverse bottom portions 35 of the shackle members are of circular cross section and the spring sockets 23 have projections at their under sides formed with V-shaped recesses in which the transverse bottom portions 35 of the shackle members are seated as shown in Fig. 3. The web of the top channel 8 of each track frame is cut out at its forward end, as shown at 33 in Fig. 2, and the shackle members 31 extend through the forward openings of the top channels 8 into the spaces between the channels 6 of the track frames, as shown in Fig. 3.

The leaves of the main spring are curved to provide an upwardly arched shape of the main spring, and the leaves of the auxiliary spring are also curved, but in the opposite direction, to provide a downwardly arched shape of the auxiliary spring. The initial shape of the main and auxiliary leaf springs is such that after the springs have been assembled and installed on the tractor as shown in Fig. 3, the main spring is urged downwardly upon the spring sockets 23 by the auxiliary spring, the latter being under an initial tension which exerts a lifting force on the shackle members 31 and holds them in engagement with the V-shaped recess at the lower side of each spring socket 23. In addition to the spring bracket 16, spring clips 34 are provided to hold the main and auxiliary leaf springs together. The V-shaped recess at the under side of the spring socket 23 affords a seat for the transverse bottom portion of the shackle member 31 in which seat the shackle member may not only pivot transversely to the track frame, but in which it may also rock or tilt in fore and aft directions relative to the track frame. Moreover, the shackle member may slide, within certain limits, relative to the spring socket in fore and aft directions, the portion of the spring socket embraced by the shackle member being of somewhat shorter width, longitudinally of the track frame, than the spacing between the legs of the shackle member, as may be seen from Figure 4. This freedom of movement of each shackle member relative to the track frame affords the freedom of movement between the ends of the auxiliary spring and the track frames which is necessary in order to relieve the auxiliary spring from substantial torsional and horizontal stresses during oscillations of the track frames. The shackle connections between the ends of the auxiliary spring and the track frames afford an adequate mean to tie the ends of the spring to the track frames in order to enable the auxiliary spring to check the rebound of the main spring, and at the same time to prevent the occurrence of substantial torsional and horizontal stresses in the auxiliary spring which would occur during oscillations of the track frames if pivotal connections like the ones employed between the upper ends of the shackle members and the auxiliary spring were used between the lower ends of the shackle members and the track frames.

The mounting of the main frame on the track frames by means of the stub axles 5 and the main leaf spring 19, 20 provides a three point suspension, two rearward points of suspension being afforded by the stub axles 5 and a forward point of suspension being afforded by the pin 17. In operation, the main frame has a tendency to pitch, that is, to rock about the common axis of the stub shafts 5, due to the resilient connection between the forward end of the main frame and the track frames, by means of the main leaf spring 19, 20. The weight of the main frame which is sustained by the main leaf spring is partly balanced by the portion of the main frame rearwardly of the axis of the stub shafts 5, this rearward portion of the main frame including the track belt drive sprockets 4 and a substantial part of the mechanism for transmitting power thereto, and also the operator's seat 36. It will be seen that with this overhanging weight at the rear of the tractor the tendency of the main frame to pitch is appreciably enhanced. The purpose and the function of the auxiliary leaf spring 21, 22 is to check or lessen the pitching of the main frame relative to the track frames, and in performing this function the auxiliary leaf spring acts as a shock absorbing element. Assuming that the tractor is running and that it is then suddenly stopped by disengagement of the master clutch, which is controlled by the hand lever 37, and by firm application of the brakes, suitable brake mechanism being standard equipment and not shown in the drawings. During the resulting deceleration of the tractor the main frame, whose center of gravity is located approximately at the point indicated by the reference character 38, will swing downwardly about the axis of stub shafts 5 against the action of main spring 19, 20, and due to the resulting deflection of the main spring a certain amount of energy will be stored therein. At the same time the auxiliary leaf spring 21, 22 will distend, but the initial tension given to the auxiliary spring is such that it will not be entirely relaxed by a downward deflection of the main spring within practical limits. As a result, the transverse bottom portions of the shackle members 31 will remain in contact with the V-shaped recesses at the lower sides of the spring sockets 23. If the deceleration has been steady up to the moment when the tractor comes to a halt, the entire energy which has been stored up in the main leaf spring 19, 20 will be released all at once at that moment, and the resulting rebound of the main leaf spring tends to impart an upward thrust to the main frame. If it were not for the auxiliary leaf spring 21, 22 and its shackle connections 31 with the track frames the forward end of the main frame would take a high upward swing which would be objectionable. The auxiliary leaf spring 21, 22, however, effectively restrains such an upward swing of the main frame, due to the fact that the rebound of the main spring 19, 20, in order to take place, must overcome the resistance of the auxiliary spring 21, 22. Similar conditions prevail during abrupt starting of the tractor.

While traveling over uneven ground or under other severe conditions of operation an upward swing of the main frame due to rebound of the main leaf spring 19, 20 could, if not checked, even become so violent as to cause breakage of the main leaf spring, particularly of the main leaf 19 thereof, which upon upward separation from the spring sockets 23 would strike the caps 25. The danger of breakage of the main leaf spring due to an excessive rebound is practically elimited by the auxiliary leaf spring 21, 22 and its shackle connections 31 with the track frames.

While the spring assembly for supporting the forward portion of the main frame on the track frames, as shown in the drawings, is deflected during oscillations of the track frames about the rearward stub axles 5 no binding occurs between any of its relatively movable parts; it can be installed on tractors of conventional design, only a few special parts being required.

While in the foregoing a preferred embodiment of the invention has been shown and described, it should be understood that it is not intended to limit the invention to the exact details of construction herein shown and described, for various modifications within the scope of the claims may occur to persons skilled in the art.

It is claimed and desired to secure by Letters Patent:

1. In a track type tractor, a main frame, track frames pivotally connected on a transverse axis to the rear of said main frame, a spring bracket pivotally connected to said main frame on a longitudinal axis in advance of said transverse axis, a lower transverse leaf spring connected intermediate its ends to said bracket, socket members secured to said track frames, the ends of said lower leaf spring being received by said socket members and bearing thereupon, an upper transverse leaf spring connected intermediate its ends to said bracket, U-shaped shackle members engaging said socket members and extending upwardly therefrom, and pivot pins extending through the upper ends of said shackle members and connecting the ends of said upper leaf spring with said shackle members.

2. In a track type tractor, a main frame, track frames pivotally connected on a transverse axis to the rear of said main frame, a spring bracket pivotally connected to said main frame on a longitudinal axis in advance of said transverse axis, a lower transverse leaf spring connected intermediate its ends to said bracket, socket members secured to said track frames, the ends of said lower leaf spring being received by said socket members and bearing thereupon, cap elements associated with said socket members and projecting over the ends of said lower leaf spring in upwardly spaced relation thereto, an upper transverse leaf spring connected intermediate its ends to said bracket, U-shaped shackle members engaging said socket members and extending upwardly therefrom, and pivot pins extending through the upper ends of said shackle members and connecting the ends of said upper leaf spring with said shackle members.

3. In a track type tractor having a main frame and track frames at opposite sides of said main frame, a main leaf spring mounted intermediate its ends on said main frame and loosely bearing at its ends upon supports secured to said track frames, an auxiliary leaf spring on top of said main leaf spring, and shackle members connecting the ends of said auxiliary leaf spring with said supports, each of said shackle members having a bottom portion extending transversely of said auxiliary leaf spring and each of said supports having a recessed projection at its under side, said bottom portions of said shackle members being loosely seated in said recessed projections of said supports.

EMIL F. NORELIUS.